(12) United States Patent  
Byrne et al.

(10) Patent No.: US 9,246,317 B2
(45) Date of Patent: Jan. 26, 2016

(54) ELECTRICAL RECEPTACLE WITH FRAMES FOR MOUNTING IN A SUPPORT

(71) Applicant: Norman R. Byrne, Ada, MI (US)

(72) Inventors: Daniel P. Byrne, Lowell, MI (US); Randell E. Pate, Jenison, MI (US)

( * ) Notice: Subject to any disclaimer, the term of this patent is extended or adjusted under 35 U.S.C. 154(b) by 0 days.

(21) Appl. No.: 14/224,184

(22) Filed: Mar. 25, 2014

(65) Prior Publication Data

US 2014/0295691 A1 Oct. 2, 2014

Related U.S. Application Data

(60) Provisional application No. 61/807,491, filed on Apr. 2, 2013.

(51) Int. Cl.
*H01R 25/00* (2006.01)
*H02G 3/10* (2006.01)
*H01R 13/74* (2006.01)

(52) U.S. Cl.
CPC ........ *H02G 3/105* (2013.01); *A47B 2200/0082* (2013.01); *H01R 13/74* (2013.01)

(58) Field of Classification Search
CPC ....... H01R 24/14; H01R 13/73; H01R 13/518
USPC .............. 439/110, 574, 538, 532, 716, 540.1, 439/536
See application file for complete search history.

(56) References Cited

U.S. PATENT DOCUMENTS

| | | | |
|---|---|---|---|
| D318,270 S | 7/1991 | Tsuji et al. | |
| 5,035,646 A * | 7/1991 | Ehrenfels et al. | 439/536 |
| 5,456,373 A * | 10/1995 | Ford | 220/242 |
| 6,028,267 A | 2/2000 | Byrne | |
| 6,290,518 B1 | 9/2001 | Byrne | |
| 6,379,182 B1 | 4/2002 | Byrne | |
| D462,056 S | 8/2002 | Chung | |
| 7,182,633 B2 | 2/2007 | Byrne | |
| D540,257 S | 4/2007 | Ivanova et al. | |
| D567,765 S | 4/2008 | Ohta | |
| 7,559,795 B2 | 7/2009 | Byrne | |

(Continued)

OTHER PUBLICATIONS

Website Printout of Panel Mounted Power Socket-Outlet REG 5TE6 Siemens Low-Voltage & Products found at http://directindustry.com/prod/siemens-low-voltage-products/panel-mounted-power-s . . . , published on or before Sep. 5, 2013.

*Primary Examiner* — Hae Moon Hyeon
(74) *Attorney, Agent, or Firm* — Gardner, Linn, Burkhart & Flory, LLP

(57) ABSTRACT

An electrical receptacle assembly is reconfigurable to provide any number of different styles or configurations of high or low voltage electrical receptacles and/or data outlets. The receptacle assembly includes a main body with an outlet receptacle portion, a flange portion extending outwardly from the main body, an upper frame member positioned generally above the flange portion, and a lower frame member positioned generally below the flange portion. A plurality of electrical contacts are positioned in the main body, and are configured to make electrical contact when the outlet receptacle portion receives an electrical or data plug associated with an electrical device. The upper and lower frame members are configured to interchangeably receive different main bodies with different outlet portions, and enable the different outlet portions to be mounted at a power center along a work surface or the like.

20 Claims, 9 Drawing Sheets

(56) References Cited

U.S. PATENT DOCUMENTS

| | | |
|---|---|---|
| 7,736,178 B2 | 6/2010 | Byrne |
| D639,244 S | 6/2011 | Byrne |
| 8,172,604 B2 | 5/2012 | Byrne |
| D667,794 S | 9/2012 | Junko et al. |
| 8,287,292 B2 | 10/2012 | Byrne |
| 8,295,036 B2 | 10/2012 | Byrne |
| D682,213 S | 5/2013 | Byrne et al. |
| 8,444,432 B2 * | 5/2013 | Byrne et al. ............ 439/540.1 |
| D685,329 S | 7/2013 | Byrne et al. |
| D686,579 S | 7/2013 | Fujioka |
| 8,480,429 B2 * | 7/2013 | Byrne .......................... 439/574 |
| 8,482,252 B2 | 7/2013 | Byrne |
| D687,778 S | 8/2013 | Utz |
| 8,512,065 B2 | 8/2013 | Byrne et al. |
| 8,616,921 B2 | 12/2013 | Byrne et al. |
| D698,314 S | 1/2014 | Byrne et al. |
| 2002/0142650 A1 * | 10/2002 | Clark et al. .................. 439/536 |
| 2007/0004274 A1 * | 1/2007 | Tabata et al. ............. 439/540.1 |
| 2010/0267278 A1 * | 10/2010 | Gonzalez ..................... 439/535 |
| 2010/0317223 A1 * | 12/2010 | Byrne ....................... 439/540.1 |
| 2012/0009820 A1 * | 1/2012 | Byrne .......................... 439/625 |
| 2012/0200989 A1 | 8/2012 | Byrne et al. |

* cited by examiner

ELECTRICAL RECEPTACLE WITH FRAMES FOR MOUNTING IN A SUPPORT

CROSS REFERENCE TO RELATED APPLICATION

The present application claims the benefit of U.S. Provisional Application, Ser. No. 61/807,491, filed Apr. 2, 2013, which is hereby incorporated herein by reference in its entirety.

FIELD OF THE INVENTION

The present invention relates to electrical power and data outlets or receptacles and, more particularly, to outlets and receptacles that are made accessible at a work surface such as a table or desk.

BACKGROUND OF THE INVENTION

Electrical power outlets and corresponding electrical plugs vary widely throughout the world, with many different shapes and electrical contact configurations in use. Even individual countries are known to have different configurations of outlets. While it is often helpful or desirable to provide one or more electrical power outlets (and/or low voltage power outlets or data outlets, or combinations thereof) along or within reach of a work surface, such as a desk, a table, or the like, providing assemblies of outlets with different configurations, within a single assembly, can be costly due to the large number of variations that may need to be accommodated for a given application, in order to meet widely variable customer or consumer demands.

SUMMARY OF THE INVENTION

The present invention provides an electrical receptacle assembly that can be reconfigured to have substantially any desired configuration of high or low voltage power receptacle or outlet, or even an electronic data or signal outlet, while reducing the amount and/or cost of tooling needed to achieve the desired level of customization. This is accomplished with an electrical receptacle subassembly having a main body with an outlet receptacle portion that can be configured as desired, which fits into one or more frame members that are substantially universal for all outlet receptacle portions and enable the finished receptacle assembly to be slid into a power receptacle support that forms part of a finished power and/or data center. The center can be readily configured or reconfigured with different types and quantities of receptacles or accessories, without making substantial changes to the overall center.

According to one form of the present invention, an electrical receptacle assembly includes an electrical receptacle subassembly, and upper frame member, and a lower frame member. The electrical receptacle subassembly includes a main body portion, a flange portion extending outwardly from the main body portion, and a plurality of electrical contacts disposed in the main body portion. The electrical contacts are configured to receive an electrical plug associated with an electrical device such as an appliance, lighting, or electronic device. The upper frame member is positioned at least partially above the flange portion of the electrical receptacle subassembly, and defines an opening through which the electrical contacts are made accessible. The lower frame member is positioned at least partially below the flange portion of the electrical receptacle subassembly. One or both of the upper and lower frame members includes a projection that is configured to engage a power receptacle support, so that the electrical receptacle assembly can be secured to the power receptacle support.

In one aspect, the upper frame member has four corners, with a respective projection located at each corner. The lower frame member also has four corners, with a respective recess formed at each corner. The recesses are arranged or configured to receive respective projections of the upper frame member when the upper and lower frame members are assembled at the flange portion of the electrical receptacle assembly.

In another aspect, the lower frame member defines and opening for receiving the main body portion of the electrical receptacle subassembly.

In yet another aspect, the main body portion of the electrical receptacle subassembly has a resilient latch tab along a side surface thereof. The resilient latch tab is spaced below the flange portion of the electrical receptacle subassembly, and the latch tab is configured to pass through the opening in the lower frame member and to engage a portion of the lower frame member that is positioned between the latch tab and the flange portion. The latch tab is thus configured to secure the lower frame member to the electrical receptacle subassembly.

In a further aspect, the flange portion of the electrical receptacle assembly is substantially enclosed between the upper and lower frame members. Optionally, the upper and lower frame members are configured so that the electrical receptacle subassembly is inseparable from the upper and lower frame members when the projections are engaged with respective ones of the first and second elongate surfaces that are formed along the inner wall of the power receptacle support.

Thus, the electrical receptacle assembly of the present invention allows for the construction or assembly of a readily-configurable or reconfigurable power center, which can provide substantially any number of different styles or configurations of high or low voltage electrical receptacles and/or data outlets at a single location, while reducing the number of different parts needed to achieve many different configurations. The finished power center may be installed at or near a work surface, for example, and may be reconfigured as needed, without replacing a large number of costly parts in order to do so.

These and other objects, advantages, purposes and features of the present invention will become apparent upon review of the following specification in conjunction with the drawings.

DESCRIPTION OF THE PREFERRED EMBODIMENTS

A mounted electrical receptacle is provided for use with a power receptacle support that is typically coupled to (or mounted near) a work surface such as a table, a desk, or the like. It is generally desirable that the number and type of receptacles at a given power receptacle support be variable according to the needs of a particular user or work area. For example, users may have need for one or more high voltage (e.g., 110V or 220V AC) standard power outlets, one or more low voltage power outlets (e.g., USB charging ports rated at about 2V to 6V DC), one or more electronic data ports (e.g., telephone, Ethernet, audio, video, etc.), as well as access to power or data cables near the work surface.

To maximize configurability for different markets around the world, which use many different styles of electrical outlets, it is advantageous to provide a common mechanical interface for substantially any number of different electrical receptacles to be mounted to a power receptacle support. This allows the finished product to be readily configured to provide any number of different styles or types of outlets, but with minimal variation in the number of parts and moldings needed to provide the desired flexibility to customize the finished product. In the present invention, and as will be described below in more detail, the common mechanical interface of the electrical receptacle assemblies is achieved by providing a pair of frames or frame members that engage any number of different electrical receptacle subassemblies having different voltage ratings and different electrical contact configurations.

Throughout this specification, the terms "upper" or "top", "lower" or "bottom", "front", "back", and "under" are used to denote relative directions as seen by a viewer facing the electrical receptacle assembly, and/or a power or data center incorporating the electrical receptacle assembly, from a normal access position. Such terms are used for clarity of description, and should not be construed as limiting in any way.

Figure 1:
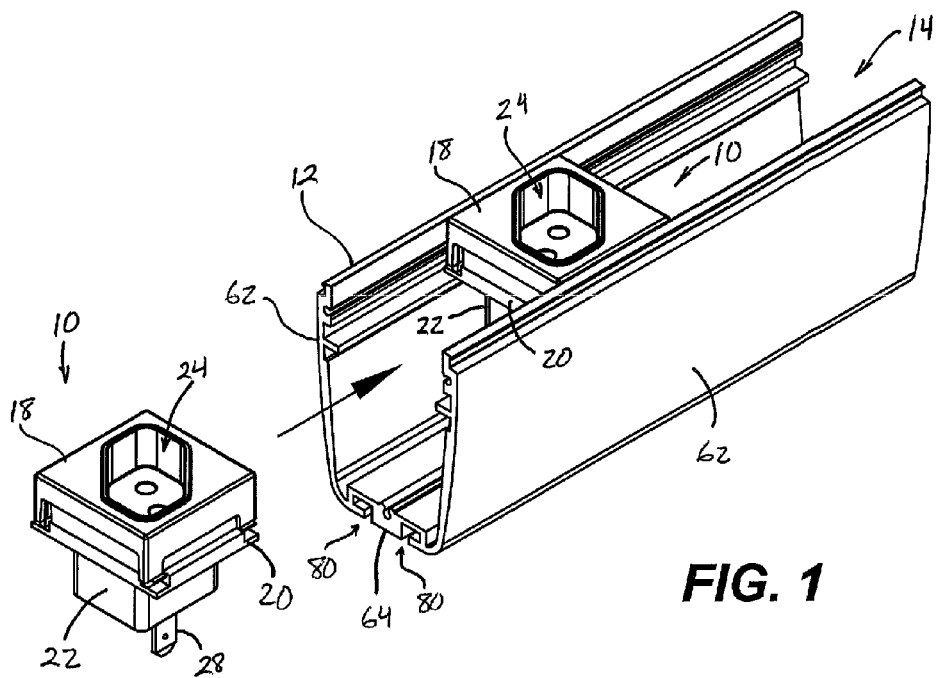
FIG. 1 is a perspective view of two mounted electrical receptacles in accordance with the present invention, which are shown being mounted along a power receptacle support.
Figure 2A:
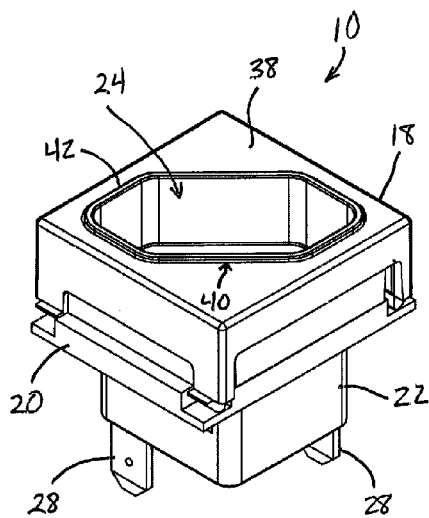
FIGS. 2A and 2B are top perspective views of one of the mounted electrical receptacles of FIG. 1.
Figure 2B:
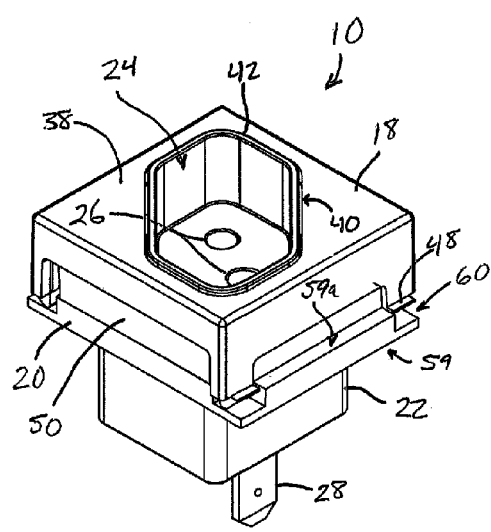

Referring now to the drawings and the illustrative embodiments depicted therein, an electrical receptacle assembly 10 is configured for installation at a power receptacle support 12 in the form of a generally U-shaped extruded member defining a channel 14, which is sized for receiving a plurality of electrical receptacle assemblies 10 or other receptacles, such as shown in FIG. 1. Electrical receptacle assembly 10 includes an electrical receptacle subassembly 16 (FIGS. 6 and 7A) that is received between an upper frame member 18 and a lower frame member 20 that cooperate to retain electrical receptacle assembly 10 in its assembled configuration, and to secure electrical receptacle assembly 10 to power receptacle support 12, as will be described below.

Electrical receptacle subassembly 16 has a main body portion 22 with an outlet receptacle portion 24 that may be configured as substantially any type or style that is needed in a particular installation (FIGS. 1-6). In the illustrated embodiment, receptacle portion 24 is configured as a Type N outlet receptacle, which has been adopted in Brazil, for example. However, it will be appreciated that the receptacle portion can be configured as substantially any type, including but not limited to: Types A and B (standard in the U.S. and Canada, and also found in Brazil, China, and other countries), Type C (found in Brazil, India, Russia, and other countries), a Type D (found in India and other countries), a Type F (found in Russia and other countries), a Type G (found in China and other countries), a Type I (found in China and other countries), a Type J (found in Spain, Switzerland, Ethiopia, and other countries), and a Schuko (found in Germany and other European countries).

Receptacle portion 24 provides access to a plurality of electrical contacts 26 (FIG. 4A) via respective openings that are configured to receive respective prongs of an electrical plug associated with an electrical consumer, such as a computer, lighting, radio or communications equipment, clocks, fans, and substantially any other electrical appliance or the like. Electrical contacts 26 extend through main body portion 22 of electrical receptacle subassembly 16, and are in electrical communication with respective male prongs 28 that project outwardly and below main body portion 16 (FIGS. 1-3 and 5A-7D), for receiving female connectors or other form of electrical contact associated with respective conductors of power supply wiring (not shown). Optionally, each male prong 28 is unitarily formed with a respective one of the electrical contacts 26, which may be molded in place with main body portion 22 of electrical receptacle subassembly 16. Main body portion 22 may be a one-piece molded resinous plastic, rubber, rubber-like material, or other suitable material, for example.

Figure 5A:
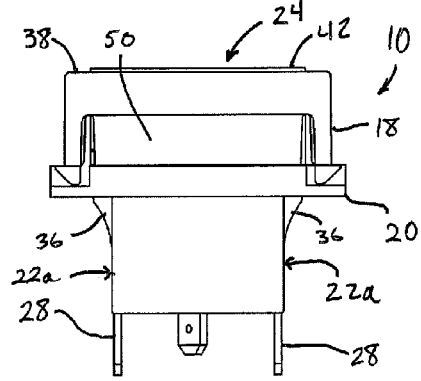
FIG. 5A is a right side elevation of the mounted electrical receptacle.
Figure 5B:
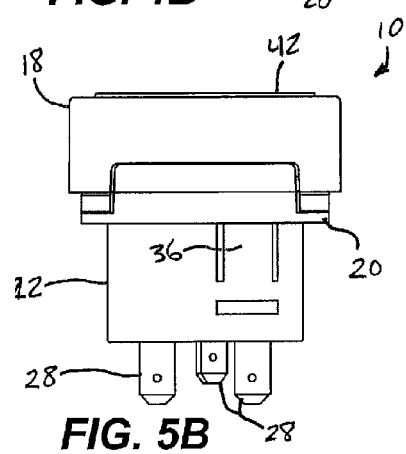
FIG. 5B is a front elevation of the mounted electrical receptacle.
Figure 6:
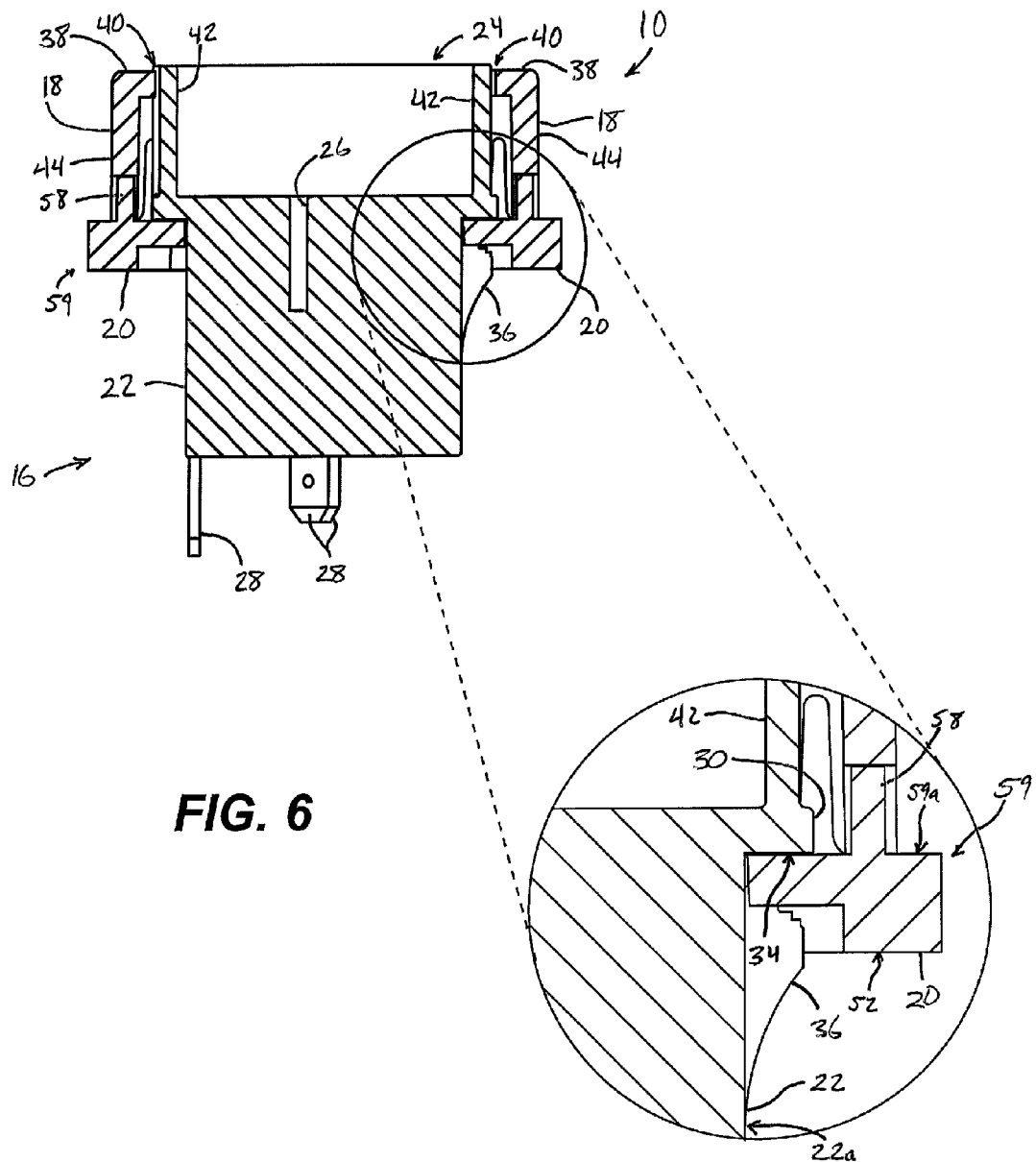
FIG. 6 is a sectional side elevation of the mounted electrical receptacle, taken along section lines VI-VI of FIG. 4A, including an enlarged portion thereof.
Figure 7A:
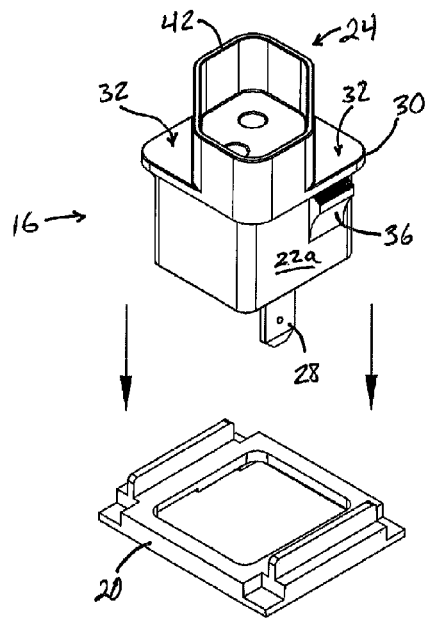
FIGS. 7A-7D are top perspective views depicting four steps in a method of assembling the mounted electrical receptacle.
Figure 7B:
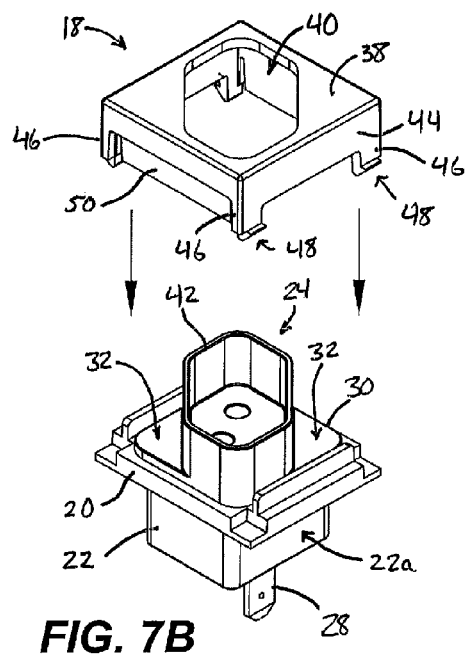
Figure 7C:
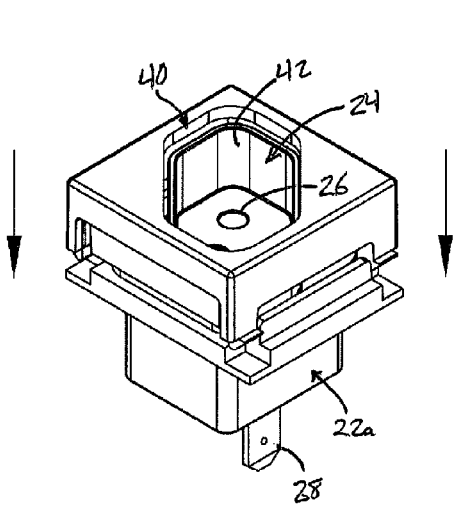

A flange portion 30 extends laterally outwardly from main body portion 22, and has a generally planar upper surface 32 (or in the case of the illustrated embodiment, two separate upper surfaces 32), and a generally planar lower surface 34 around a perimeter of main body portion 22, such as shown in FIGS. 7A and 7B. A resilient latch tab 36 is disposed along each of two opposite side surfaces 22a of main body portion 22, and is spaced below flange portion 30 (FIG. 6). Latch tab 36 may be a substantially rigid cantilevered member (such as shown in FIG. 5B) that flexes at its lower end, or it may be made of a relatively soft resilient material that allows it to compress into and/or against the respective side surface 22a of main body portion 22, or a combination of both flexion and compression. The resilience of latch tab 36 allows it to pass through lower frame member 20 in order to secure the lower frame member 20 to main body portion 22, as will be described below in more detail.

Figures 9A, 9B:
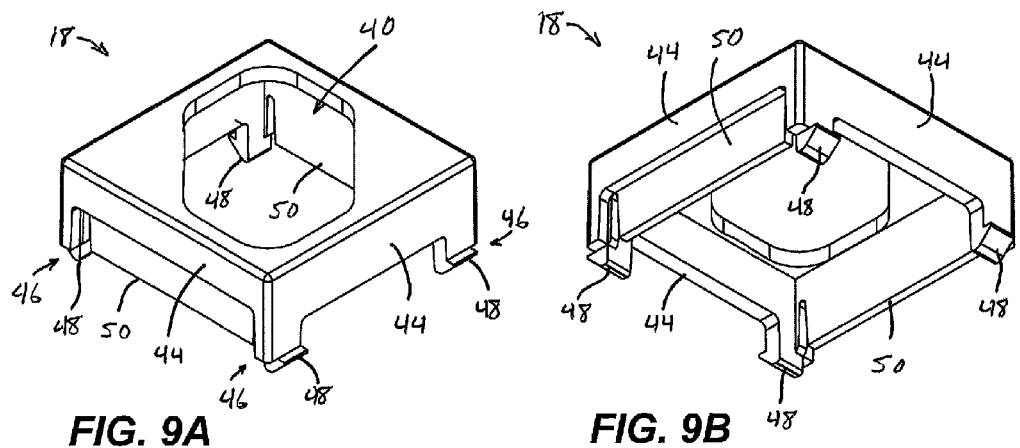
FIG. 9A is a top perspective view of a upper frame member of the mounted electrical receptacle.
FIG. 9B is a bottom perspective view of the upper frame member of FIG. 9A.

Upper frame member 18 has a generally planar upper surface 38 defining an opening 40 for receiving an upper end of outlet receptacle portion 24 of main body portion 22 of the electrical receptacle subassembly 16 (FIGS. 1-2B, 4A, 7B-7D, 9A, and 9B). In the illustrated embodiment, upper surface 38 is generally square in shape, but it will be appreciated that other rectangular shapes may also be suitable, for example. Opening 40 is shaped to closely conform to the outer perimeter shape of an upstanding wall 42 that forms a part of outlet receptacle portion 24, and may be selected according to the type of outlet receptacle associated with the upper frame member 18. Upper frame member 18 further includes four generally planar sidewalls 44 that meet at four corners where four legs 46 extend downwardly to form the lowermost portions of upper frame member 18 (FIGS. 2A-3, 5A, 6, 7C, 7D, 9A, and 9B). Each leg 46 has an outwardly-extending projection 48 for sliding engagement with power receptacle support 12, as will be described below. Two projections 48 extend below respective legs 46 and outwardly from one side of upper frame member 18 (i.e., outwardly from one of the sidewalls 44), and the other two projections 48 extend outwardly from the other legs 46 along the opposite side of upper frame member 18 (i.e., outwardly from the opposite sidewall 44), such as shown in FIGS. 5A and 9B. A pair of opposite recessed sidewalls 50 extend downwardly from upper surface 38 approximately the same distance as legs 46 (FIGS. 3 and 5A), and are recessed inwardly from corresponding ones of sidewalls 44.

Figure 3:
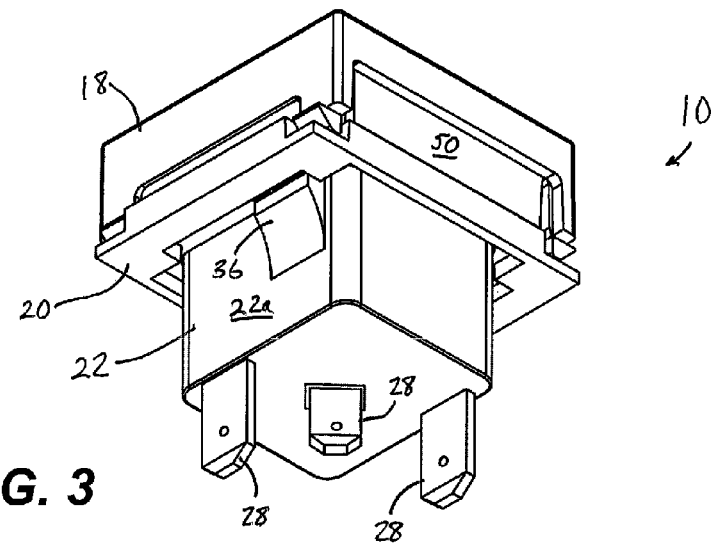
FIG. 3 is a bottom perspective view of the mounted electrical receptacle.
Figure 4A:
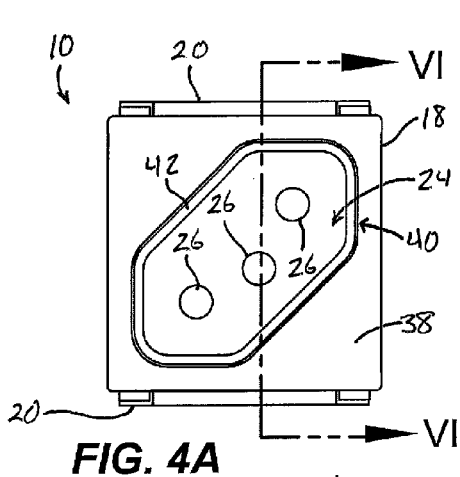
FIG. 4A is a top plan view of the mounted electrical receptacle.
Figure 4B:
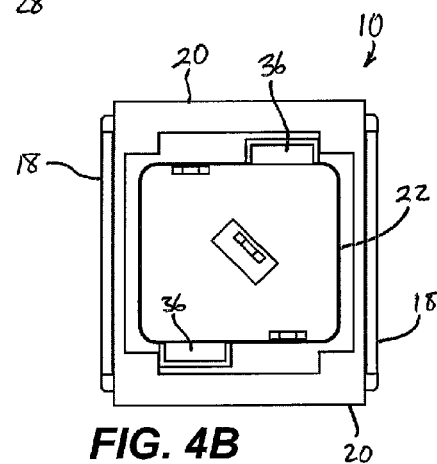
FIG. 4B is a bottom plan view of the mounted electrical receptacle.
Figure 14:
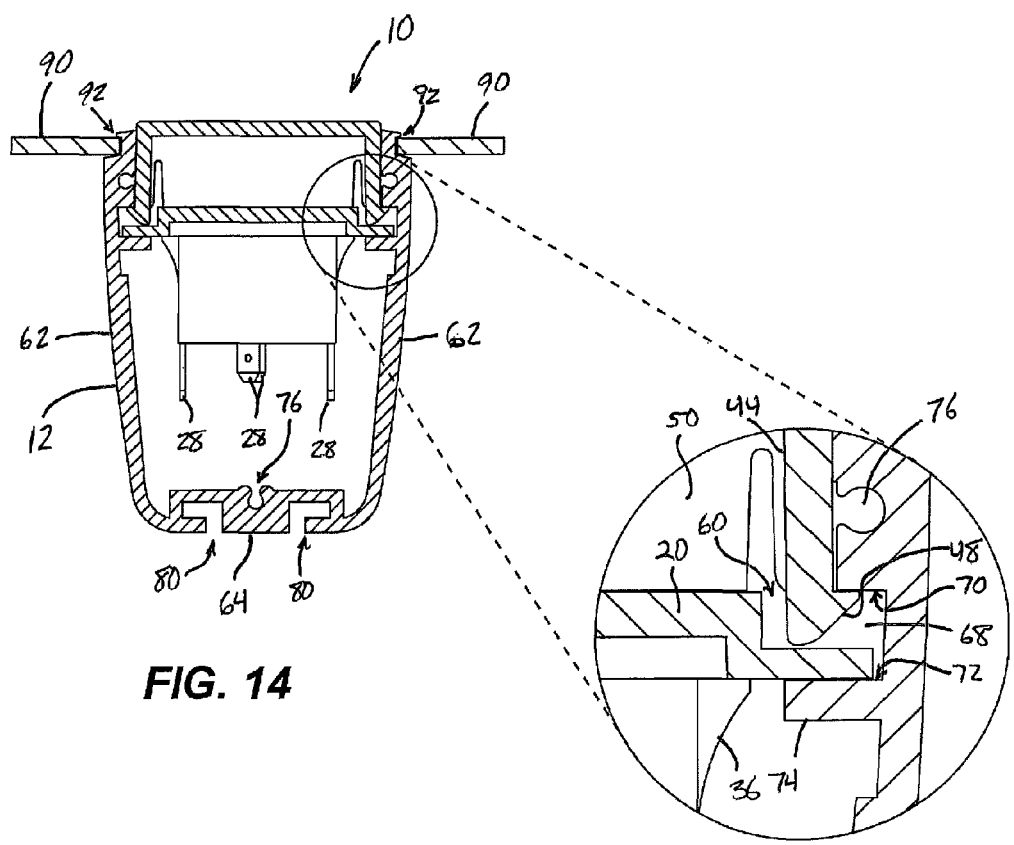
FIG. 14 is a side sectional elevation taken along section lines XIV-XIV of FIG. 13, including an enlarged portion thereof.

Lower frame member 20 has a generally planar lower surface 52 and an upper surface 54 that is shaped to receive or engage lower portions of upper frame member 18, with an opening 56 for receiving main body portion 22 of electrical receptacle subassembly 16 below flange portion 30 (FIGS. 2A-3 and 4B-8B). When lower frame member 20 is attached to electrical receptacle subassembly 16 (FIGS. 7A and 7B), prongs 28 first pass through opening 56, followed by a lower end of main body portion 22, and then latch tabs 36 are compressed until lower frame member 20 passes over them, such as also shown in FIGS. 3, 6, and 14. Latch tabs 36 snap outwardly once they are cleared by lower frame member 20, which secures the lower frame member against the generally planar lower surface 34 of flange portion 30 (FIG. 6).

Upper surface 54 of lower frame member 20 includes a pair of upright sidewalls 58 extending upwardly from a generally planar portion 54a of upper surface 54 (FIGS. 7A, 7B, 8A, and 8B). Upright sidewalls 58 engage lower ends of sidewalls 44 of upper frame member 18 upon installation of both frame members 18, 20 at electrical receptacle subassembly 16 (FIGS. 5B and 6). Respective edge portions or projections 59 of lower frame member 20 extend outwardly beyond upright sidewalls 58 (FIGS. 7A, 7B, 8A, and 8B), and are received by power receptacle support 12 (FIGS. 10 and 12), as will be described below. Upper surfaces 59a of edge portions 59 are generally co-planar with planar portion 54a of upper surface 54. Upper surface 54 further defines four corner recesses 60 that receive respective legs 46 and projections 48 at the corresponding corners of upper frame member 18, such as shown in FIGS. 2A-4A, 5A-5B, 7D, and 14.

Figure 7D:
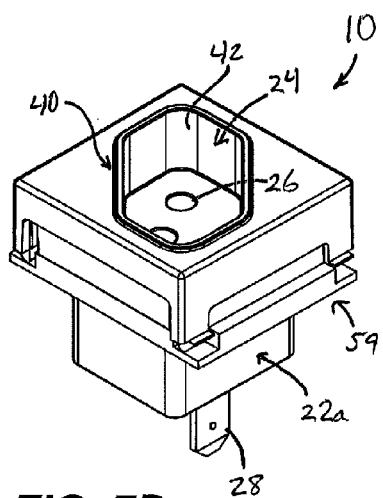
Figures 8A, 8B:
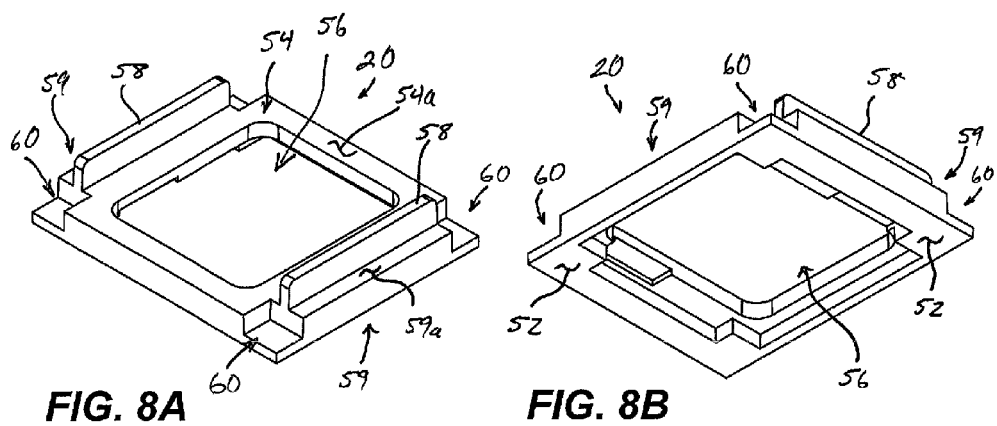
FIG. 8A is a top perspective view of a lower frame member of the mounted electrical receptacle.
FIG. 8B is a bottom perspective view of the lower frame member of FIG. 8A.

Lower frame member 20 and upper frame member 18 are typically assembled to electrical receptacle subassembly 16 in a manner depicted sequentially in FIGS. 7A-7D, to complete the electrical receptacle assembly 10. A lower portion of electrical receptacle subassembly 16 is inserted through opening 56 of lower frame member 20 (FIG. 7A) in the manner described above, so that latch tabs 36 secure lower frame member 20 in place just below flange portion 30. Upper frame member 18 is then lowered over outlet receptacle portion 24 of main body portion 22 (FIGS. 7B and 7C) until upper frame member 18 is fully seated with upstanding wall 42 of outlet receptacle portion 24 received in opening 40, and with lower portions of legs 46 and projections 48 positioned in corner recesses 60 of lower frame member 20, such as shown in FIG. 7D.

In its assembled configuration of FIG. 7D, electrical receptacle assembly 10 is ready for installation at power receptacle support 12 via sliding engagement therewith (FIGS. 1 and 10), which secures electrical receptacle assembly 10 in its assembled configuration as will be described below. However, prior to installation at power receptacle support 12, electrical receptacle assembly 10 may be readily disassembled, such as in the reverse order of assembly described above. In the illustrated embodiment, upper frame member 18 is generally not retained or secured to electrical receptacle subassembly 16, or to lower frame member 20, such that upper frame member 18 can be readily pulled away from receptacle subassembly 16 and lower frame member 20 as long as electrical receptacle assembly 10 is not installed at power receptacle support 12. Lower frame member 20 may be removed by first squeezing or depressing both latch tabs 36 a sufficient distance so that they can pass through opening 56 in lower frame member 20, which is then moved downwardly along main body portion 22 of electrical receptacle subassembly 16.

Referring now to FIG. 14, power receptacle support 12 is an elongate member having a substantially constant cross-section profile along its length. Power receptacle support 12 is generally U-shaped with a pair of opposing sidewalls 62 spaced apart from one another, and a base or web portion 64 extending between the sidewalls 62 at one end thereof. Each sidewall 62 has a respective inwardly-directed surface 66 with an outlet-receiving channel or groove 68 defined between an elongate first or upper channel surface 70 and an elongate second or lower channel surface 72 spaced below upper channel surface 70. In the illustrated embodiment, lower channel surface 72 is part of an inwardly-extending elongate support wall or shelf 74, which is configured to support electrical receptacle assemblies 10 along power receptacle support 12. Optionally, a generally circular channel 76 is formed in each sidewall 62, above outlet-receiving groove 68, and is configured to receive self-tapping screws during final assembly of a power and/or data center 78, as will be described below.

Power receptacle support 12 may be made from substantially any sufficiently strong material, such as extruded aluminum or resinous plastic, or the like. While molding and/or machining processes may be used in forming power receptacle support 12, it will be appreciated that forming power receptacle support 12 via an extrusion process allows for it to be cut-to-length as needed, to accommodate substantially any desired quantity and/or type of power and/or data receptacles or other accessories at the power receptacle support 12.

Figure 10:
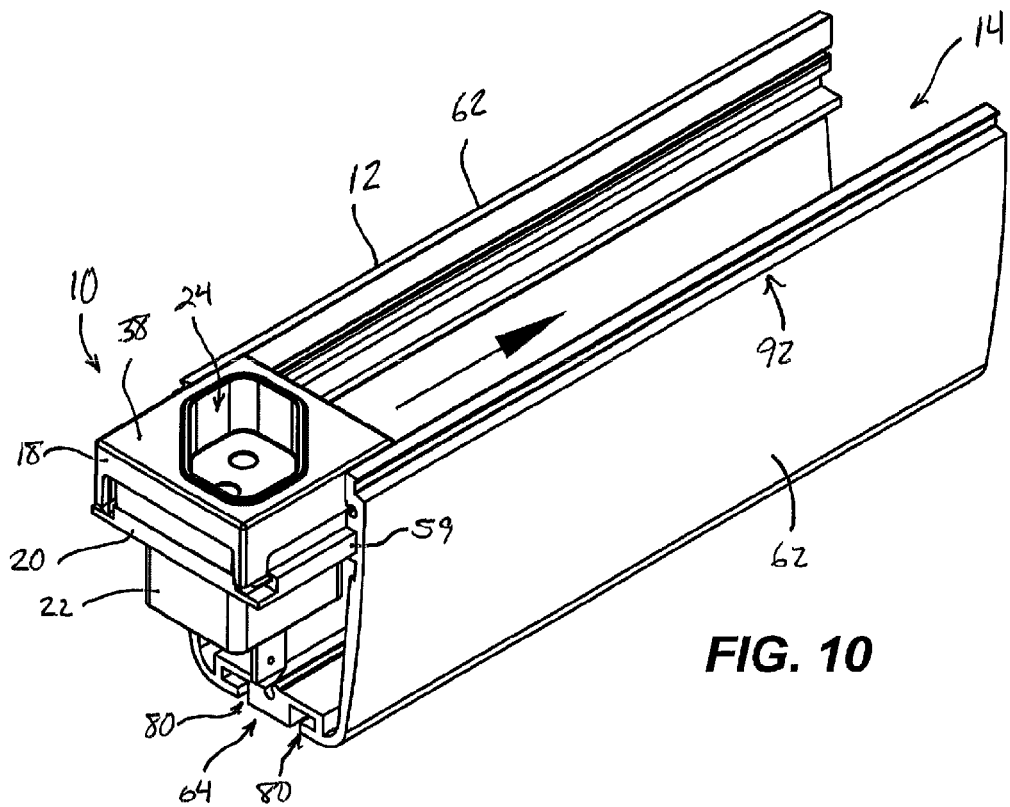
FIG. 10 is a top perspective view of the mounted electrical receptacle shown partially engaged with the power receptacle support of FIG. 1.

Electrical receptacle assembly 10 is installed at power receptacle support 12 by aligning respective edge portions 59 of lower frame member 20 with outlet-receiving grooves 68 in the opposite sidewalls 62 of power receptacle support 12. When edge portions 59 are properly aligned with grooves 68 and upper frame member 18 is fully seated on electrical receptacle subassembly 16, upper surfaces 59a of edge portions 59 and upper surfaces 48a of projections 48 are substantially coplanar (such as shown in FIG. 5A) and are aligned for sliding engagement with upper channel surface 70 (FIG. 10). At the same time, lower surface 52 of lower frame member 20 (in the vicinity of edge portions 59) is aligned for sliding engagement with lower channel surface 72. Electrical receptacle assembly 10 is then ready to be slid along power receptacle support 12, which captures or secures upper frame member 18 in place on electrical receptacle assembly 10 via engagement of projections 48 with upper channel surface 70 (FIG. 14).

Figure 11:
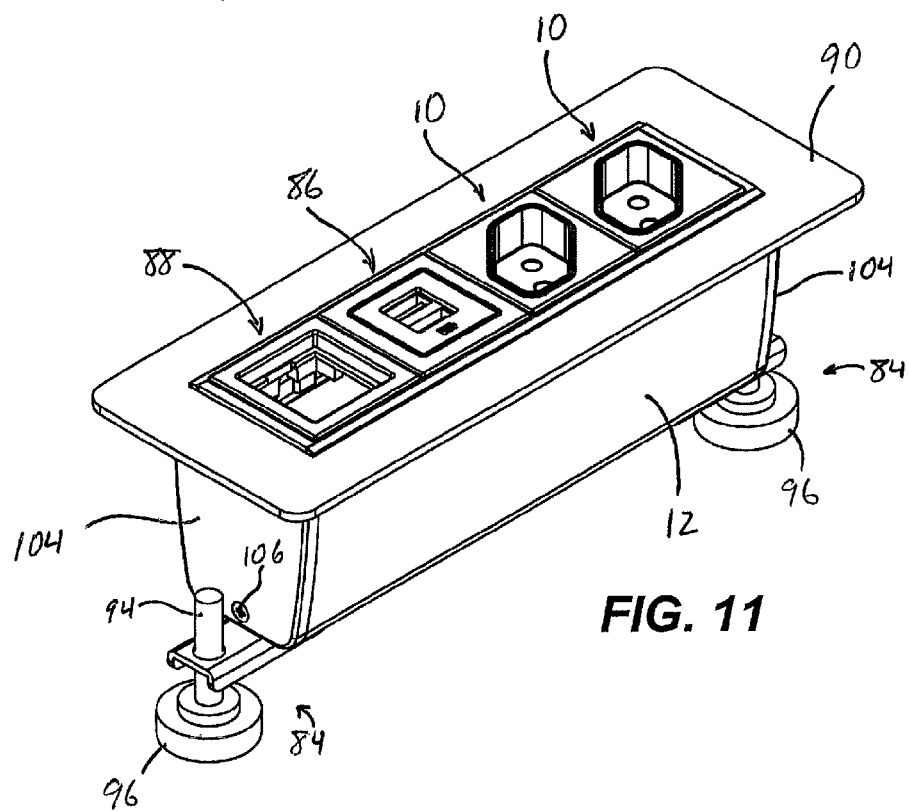
FIG. 11 is a top perspective view of a fully assembled power assembly for mounting at a work surface, and including two mounted electrical receptacles, a low-voltage power receptacle, and an open frame.
Figure 12:
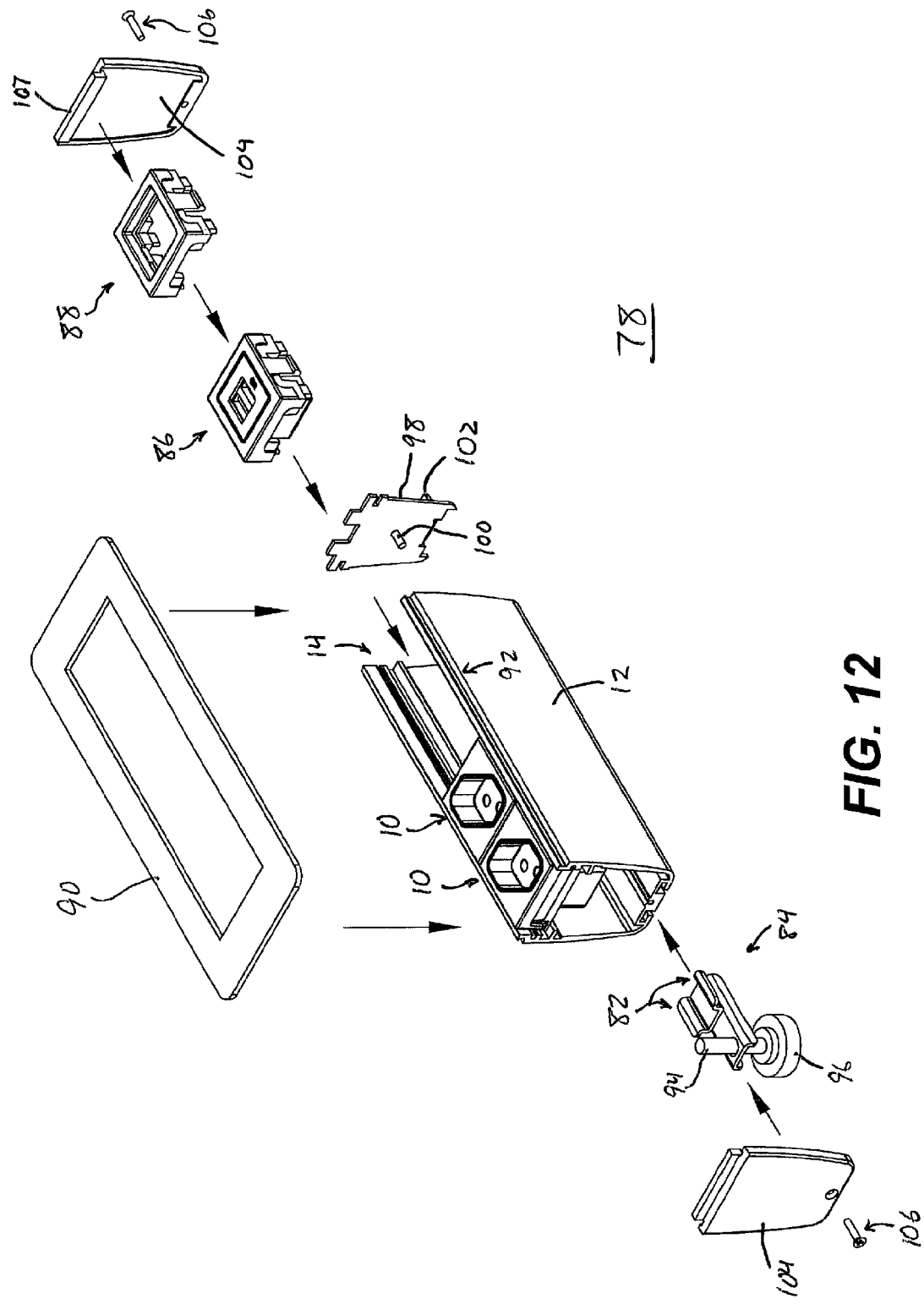
FIG. 12 is an exploded perspective view of the power assembly of FIG. 11.
Figure 13:
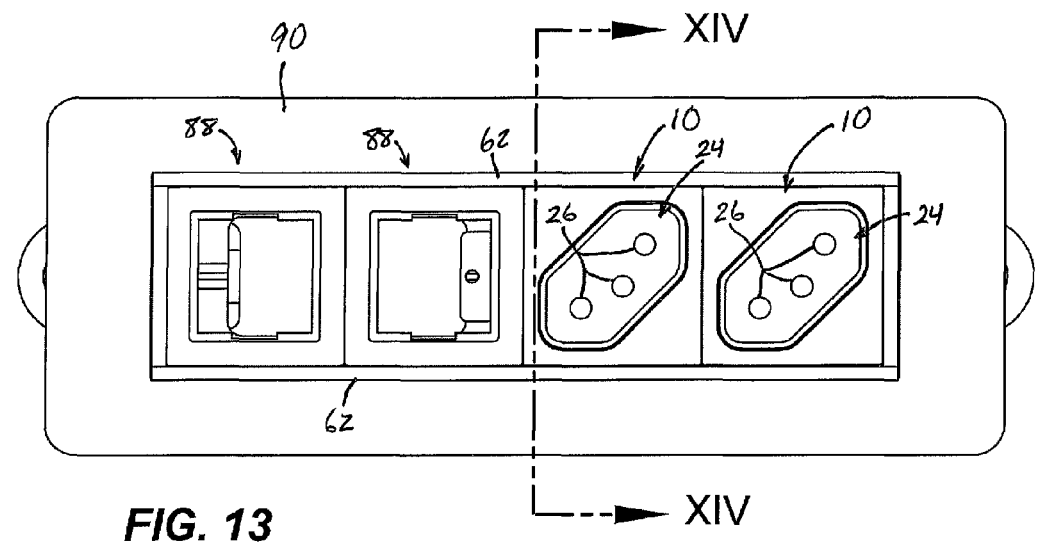
FIG. 13 is a top plan view of another power assembly similar to that of FIG. 11.

In the illustrated embodiment, base portion 64 of power receptacle support 12 defines a pair of L-shaped channels 80 in a mirror-image arrangement, which are open along a bottom surface of base portion 64. L-shaped channels 80 facilitate different mounting arrangements for power receptacle support, such as on, along, or near a work surface such as a desk or a table. For example, and as shown in FIGS. 11 and 12, L-shaped channels 80 may receive respective L-shaped legs 82 (FIG. 12) of a clamp assembly 84 that is used to secure the power and/or data center 78 at a generally rectangular opening that is formed or established in a work surface, a wall surface, or the like. Another generally circular channel 76 is formed in the middle of base portion 64, open to channel 14, and may receive self-tapping screws during final assembly.

Figure 15:
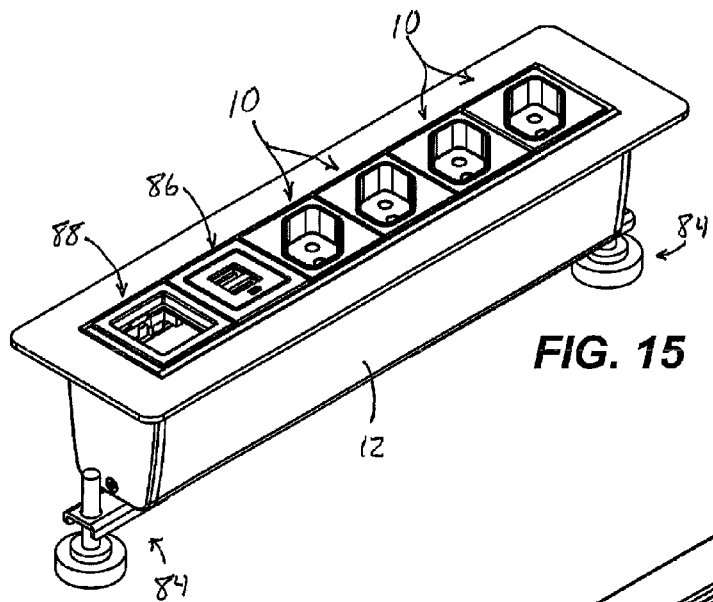
FIG. 15 is a perspective view of another power assembly similar to that of FIG. 11, and having extra length for supporting additional mounted electrical receptacles.

A complete power and/or data center 78 (hereinafter "power center 78"), such as shown in FIGS. 11 and 12, may be assembled from one power receptacle support 12, one or more electrical receptacle assemblies 10, and optionally, one or more other electrical or data assemblies, such as a low-voltage USB charging receptacle 86, as well as optional access windows or frames 88 (FIGS. 11, 12, and 15). Various other types of accessories or devices are mountable at power receptacle support 12, such as those described in commonly-owned U.S. Pat. No. 8,480,429, which is hereby incorporated herein by reference in its entirety. A top frame or bezel 90 may be snap-fit into grooves 92 formed along an outboard surface near the top of each sidewall 62, such as shown in FIGS. 12 and 14, to present a finished, clean appearance, particularly when power center 78 is to be mounted in an opening in work surface, wall, or the like. Clamp assemblies 84 attached to opposite ends of power receptacle support 12 in the manner described above, and include screws 94 with knobs 96 for tightening the screws against the underside or backside of a mounting surface (i.e., work surface, wall, or the like).

Where both high-voltage receptacle assemblies 10 and one or more low-voltage receptacle assemblies (e.g., USB charging receptacle 86) will be used in the same power center 78, it may be appropriate or necessary to insert a divider wall 98 between the high-voltage and low-voltage receptacle assemblies, such as shown in FIG. 12. Divider wall 98 may be made of insulating material, and have a shape that generally conforms to the inner shape of the sidewalls 62 and base portion 64 of power receptacle support 12. A peg or projection 100 extends outwardly from divider wall 98, on the high-voltage side thereof, and may contact main body portion 22 of the adjacent electrical receptacle subassembly 16 to help maintain substantially vertical alignment of divider wall 98 in channel 14, while a lower plate 102 extends outwardly from an opposite (low voltage) side of divider wall 98, and may engage base portion 64 of power receptacle support 12 for substantially the same purpose of maintaining alignment.

Once all of the desired receptacles 10, 86 or other accessories or components (e.g., access frames 88), and divider wall 98 (if needed), are installed along power receptacle support 12, a pair of end caps 104 are installed at the opposite ends of power receptacle support 12 and typically are secured using one or more threaded fasteners such as self-tapping screws 106, which engage respective screw channels 76 formed in power receptacle support 12 (FIG. 12). In the illustrated embodiment, end caps 104 have a shape that generally corresponds to the outer surfaces of sidewalls 62 and bottom wall 64. An inwardly-offset top wall 107 spans most of the width of each end cap 104, and is sized and positioned to be received in a space or recess 108 defined between (i) the nearest sidewall 44 of upper frame member 18, (ii) the nearest portion of upper surface 54 of lower frame member 20, and (iii) the nearest upright sidewall 58 of lower frame member 20. This arrangement of end cap 104 helps to secure the end-most electrical receptacle assembly in power center 78. Bezel 90 may then be snapped onto the top of power receptacle support 12 at grooves 92 formed in sidewalls 62, thus completing assembly of the power center 78 as shown at FIG. 11.

Figure 16:
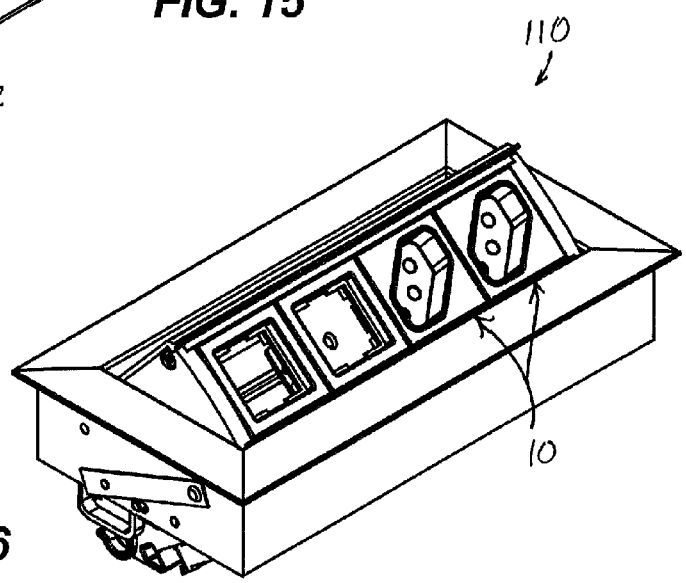
FIG. 16 is a perspective view of a raisable and lowerable electrical power center for mounting in a work surface, and having two mounted electrical receptacles.
Figure 17:
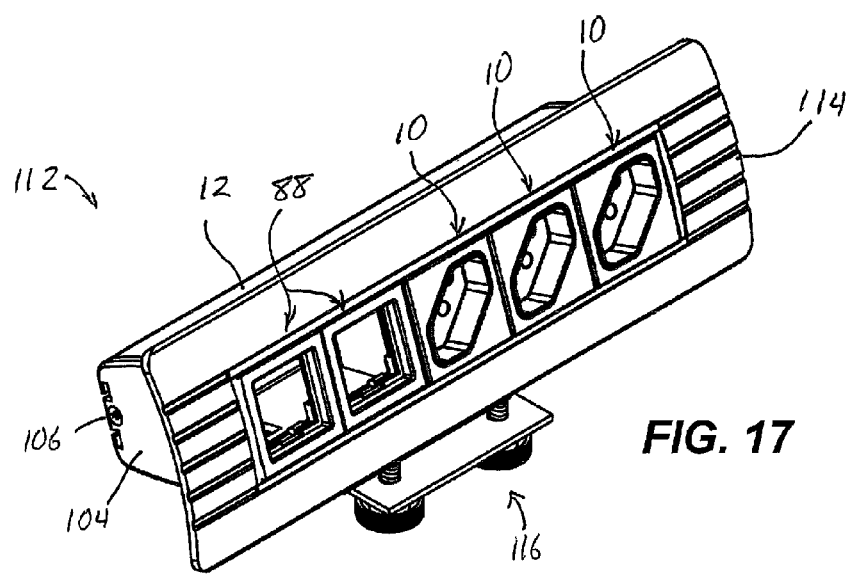
FIG. 17 is a perspective view of another electrical power assembly similar to that of FIG. 11, but configured for clamping to an edge of a work surface.

As described above, power receptacle support 12 may be cut to substantially any desired length, such as shown in FIG. 15, in which four electrical receptacle assemblies 10 are combined with a USB charging receptacle 86 and an access frame 88. Other configurations of power center are also envisioned. For example, electrical receptacle assemblies 10 may be incorporated in a pivoting power center 110 (FIG. 16), for which a somewhat similar device is more fully described in commonly-owned U.S. Pat. No. 8,287,292, which is hereby incorporated herein by reference in its entirety. In addition, electrical receptacle assemblies 10 may be incorporated in a clamp-on power center 112 that can be temporarily attached along an edge portion of a work surface such as a table or desk, so that a substantial portion of the power center 112 is positioned above the work surface. Power center 112 has a curved bezel 114 with aesthetic grooves, and a clamp assembly 116 coupled to the power receptacle support 12 in a similar manner as clamp assemblies 84, described above, and such as is more fully described in commonly-owned U.S. Pat. No. 7,736,178, and U.S. Pat. No. 8,444,432, which are hereby incorporated herein by reference in their entireties.

Accordingly, the electrical receptacle assembly and corresponding power center of the present invention provides a readily-configurable (and reconfigurable) power source that can be customized according to country and/or desired types or styles of charging and data outlets for a given application or customer or end user need. The high commonality of parts, irrespective of the type of outlets being provided at a given power center, allows for a wide range of customization without incurring excessive costs, and also allows for reconfiguring the outlets as needed or desired. Both high voltage power outlets and low voltage outlets may be provided at the same reconfigurable power center, and data outlets may also be provided in a similar manner as the other outlets, if desired. The power center may be installed at or near a work surface in a number of different ways, such as by securing it in an opening formed in a table, desk, or other work surface, or in a wall or other surface nearby, or may be clamped to a work surface or wall in a more exposed configuration, such as may be suitable for more temporary installations, or where an opening formed in a work surface is not available or desirable.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical receptacle assembly comprising:
an electrical receptacle subassembly comprising a main body portion, a flange portion extending outwardly from said main body portion, and a plurality of electrical contacts disposed in said main body portion, said electrical contacts configured to receive respective prongs of an electrical plug associated with an electrical consumer;
an upper frame member disposed at least partially above said flange portion of said electrical receptacle subassembly, said upper frame member defining an opening through which said electrical contacts are accessible by the prongs of the electrical plug;
a lower frame member disposed at least partially below said flange portion of said electrical receptacle subassembly; and
wherein at least one of said upper frame member and said lower frame member comprises a projection at each of two opposite sides thereof, said projections extending outwardly in opposite directions from one another and thereby configured to engage respective inwardly-facing surfaces at opposite sides of a power receptacle support to thereby secure said electrical receptacle assembly to the power receptacle support.

2. The electrical receptacle assembly of claim 1, wherein each of said upper frame member and said lower frame member comprises respective ones of said projections, and wherein said projections of said upper frame member are configured to slidably engage respective first surfaces of the power receptacle support, and said projections of said lower frame member are configured to slidably engage respective second surfaces of the power receptacle support that generally oppose respective ones of the first surfaces of the power receptacle support.

3. The electrical receptacle assembly of claim 2, wherein said upper and lower frame members are configured so that said electrical receptacle subassembly is inseparable from said upper and lower frame members when said projections are engaged, respectively, with the first and second surfaces of the power receptacle support.

4. The electrical receptacle assembly of claim 2, wherein said upper frame member comprises at least two of said projections at each of said opposite sides thereof.

5. The electrical receptacle assembly of claim 4, wherein said upper frame member comprises four corners, with a respective one of said projections of said upper frame member positioned at each of said corners thereof, and wherein said lower frame member comprises four corners, with a respective recess formed at each of said corners thereof, said recesses configured to receive respective ones of said projections of said upper frame member when said upper and lower frame members are assembled at said flange portion of said electrical receptacle assembly.

6. The electrical receptacle assembly of claim 1, wherein said flange portion of said electrical receptacle assembly is substantially enclosed between said upper and lower frame members.

7. The electrical receptacle assembly of claim 1, wherein said electrical receptacle subassembly is configured as one chosen from: (i) a Type A outlet receptacle, (ii) a Type B outlet receptacle, (iii) a Type C outlet receptacle, (iv) a Type D outlet receptacle, (v) a Type F outlet receptacle, (vi) a Type G outlet receptacle, (vii) a Type I outlet receptacle having a ground pin and a pair of live pins forming a V-shape, (viii) a Type J outlet receptacle, (ix) a Type N outlet receptacle, and (x) a Schuko outlet receptacle.

8. The electrical receptacle assembly of claim 1, wherein said lower frame member defines an opening for receiving said main body portion of said electrical receptacle subassembly.

9. An electrical receptacle assembly comprising:
an electrical receptacle subassembly comprising a main body portion, a flange portion extending outwardly from said main body portion, and a plurality of electrical contacts disposed in said main body portion, said electrical contacts configured to receive respective prongs of an electrical plug associated with an electrical consumer;
an upper frame member disposed at least partially above said flange portion of said electrical receptacle subassembly, said upper frame member defining an opening through which said electrical contacts are accessible by the prongs of the electrical plug;
a lower frame member disposed at least partially below said flange portion of said electrical receptacle subassembly, wherein said lower frame member defines an opening for receiving said main body portion of said electrical receptacle subassembly;
wherein at least one of said upper frame member and said lower frame member comprises a projection that is configured to engage a power receptacle support to thereby secure said electrical receptacle assembly to the power receptacle support; and
wherein said main body portion of said electrical receptacle subassembly comprises a resilient latch tab along a side surface thereof, said resilient latch tab spaced below said flange portion of said electrical receptacle subassembly, wherein said latch tab is configured to pass through said opening in said lower frame member and engage a portion of said lower frame member that is positioned between said latch tab and said flange portion to thereby secure said lower frame member to said electrical receptacle subassembly.

10. An electrical receptacle assembly comprising:
an electrical receptacle subassembly comprising a main body portion, a flange portion extending outwardly from said main body portion, and a plurality of electrical contacts disposed in said main body portion, said electrical contacts configured to receive respective prongs of an electrical plug associated with an electrical consumer;
an upper frame member disposed at least partially above said flange portion of said electrical receptacle subassembly, said upper frame member defining an opening through which said electrical contacts are accessible by the prongs of the electrical plug;
a lower frame member disposed at least partially below said flange portion of said electrical receptacle subassembly;
a power receptacle support having a pair of opposite walls spaced apart from one another, wherein each of said opposite walls comprises an elongate projection or groove; and
wherein at least one of said upper frame member and said lower frame member comprises a projection that is configured to engage said power receptacle support at said elongate projection or groove to thereby secure said electrical receptacle assembly to said power receptacle support.

11. An electrical receptacle assembly comprising:
an electrical receptacle subassembly comprising a main body portion, a flange portion extending outwardly from said main body portion, and a plurality of electrical contacts disposed in said main body portion, said electrical contacts configured to receive respective prongs of an electrical plug associated with an electrical consumer;

an upper frame member configured to receive at least an upper portion of said flange portion of said electrical receptacle subassembly, said upper frame member defining an opening through which said electrical contacts are accessible by the prongs of the electrical plug;

a lower frame member configured to receive at least a lower portion of said flange portion of said electrical receptacle subassembly, said lower frame member defining an opening through which said main body portion of said electrical receptacle subassembly is received; and wherein each of said upper frame member and said lower frame member comprises a pair of projections that are configured to engage a power receptacle support and thereby secure said electrical receptacle assembly to the power receptacle support, wherein said projections of said upper frame member are configured to slidably engage an first elongate surface formed along an inner wall of the power receptacle support, and said projections of said lower frame member are configured to slidably engage a second elongate surface formed along the inner wall of the power receptacle support.

12. The electrical receptacle assembly of claim 11, wherein said upper and lower frame members are configured so that said electrical receptacle subassembly is inseparable from said upper and lower frame members when said projections are engaged, respectively, with the first and second elongate surfaces formed along the inner wall of the power receptacle support.

13. The electrical receptacle assembly of claim 12, further in combination with the power receptacle support, wherein said power receptacle support is configured for mounting along a work surface.

14. The electrical receptacle assembly of claim 13, wherein said first and second elongate surfaces of said power receptacle support define upper and lower surfaces, respectively of an elongate groove formed in said inner wall of said power receptacle support.

15. The electrical receptacle assembly of claim 11, wherein said upper frame member comprises four corners, with a respective one of said projections of said upper frame member positioned at each of said corners thereof, and wherein said lower frame member comprises four corners, with a respective recess formed at each of said corners thereof, said recesses configured to receive respective ones of said projections of said upper frame member when said upper and lower frame members are assembled at said flange portion of said electrical receptacle assembly.

16. The electrical receptacle assembly of claim 15, wherein said flange portion of said electrical receptacle assembly is substantially enclosed between said upper and lower frame members.

17. The electrical receptacle assembly of claim 16, wherein said upper and lower frame members are configured so that said electrical receptacle subassembly is inseparable from said upper and lower frame members when said projections are engaged, respectively, with the first and second elongate surfaces formed along the inner wall of the power receptacle support.

18. The electrical receptacle assembly of claim 11, wherein said electrical receptacle subassembly is configured as one chosen from: (i) a Type A outlet receptacle, (ii) a Type B outlet receptacle, (iii) a Type C outlet receptacle, (iv) a Type D outlet receptacle, (v) a Type F outlet receptacle, (vi) a Type G outlet receptacle, (vii) a Type I outlet receptacle having a ground pin and a pair of live pins forming a V-shape, (viii) a Type J outlet receptacle, (ix) a Type N outlet receptacle, and (x) a Schuko outlet receptacle.

19. The electrical receptacle assembly of claim 11, wherein said lower frame member defines an opening for receiving said main body portion of said electrical receptacle subassembly.

20. The electrical receptacle assembly of claim 19, wherein said main body portion of said electrical receptacle subassembly comprises a resilient latch tab along a side surface thereof, said resilient latch tab spaced below said flange portion of said electrical receptacle subassembly, wherein said latch tab is configured to pass through said opening in said lower frame member and engage a portion of said lower frame member that is positioned between said latch tab and said flange portion to thereby secure said lower frame member to said electrical receptacle subassembly.

* * * * *